United States Patent
Fujiwara et al.

(10) Patent No.: US 12,203,047 B2
(45) Date of Patent: Jan. 21, 2025

(54) DEFOAMING AGENT, LUBRICATING OIL COMPOSITION CONTAINING DEFOAMING AGENT, AND MACHINE USING LUBRICATING OIL COMPOSITION

(71) Applicant: DIC Corporation, Tokyo (JP)

(72) Inventors: Ryuta Fujiwara, Ichihara (JP); Yoshiyuki Yaoita, Ichihara (JP); Nobuyuki Koike, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/267,550

(22) PCT Filed: Dec. 9, 2021

(86) PCT No.: PCT/JP2021/045260
§ 371 (c)(1),
(2) Date: Jun. 15, 2023

(87) PCT Pub. No.: WO2022/138186
PCT Pub. Date: Jun. 30, 2022

(65) Prior Publication Data
US 2024/0060000 A1 Feb. 22, 2024

(30) Foreign Application Priority Data
Dec. 24, 2020 (JP) ................. 2020-214827

(51) Int. Cl.
| | | |
|---|---|---|
| C10M 169/04 | (2006.01) | |
| C08F 220/34 | (2006.01) | |
| C08F 290/06 | (2006.01) | |
| C10M 149/02 | (2006.01) | |
| C10M 155/02 | (2006.01) | |
| C10N 20/04 | (2006.01) | |
| C10N 30/18 | (2006.01) | |
| C10N 40/00 | (2006.01) | |
| C10N 40/04 | (2006.01) | |
| C10N 40/25 | (2006.01) | |

(52) U.S. Cl.
CPC ..... C10M 169/041 (2013.01); C08F 220/343 (2020.02); C08F 220/346 (2020.02); C08F 290/068 (2013.01); C10M 149/02 (2013.01); C10M 155/02 (2013.01); C08F 2800/20 (2013.01); C10M 2203/003 (2013.01); C10M 2217/02 (2013.01); C10M 2229/041 (2013.01); C10N 2020/04 (2013.01); C10N 2030/18 (2013.01); C10N 2040/04 (2013.01); C10N 2040/25 (2013.01); C10N 2040/40 (2020.05)

(58) Field of Classification Search
CPC ............ C10M 169/041; C10M 149/02; C10M 155/02; C10M 2203/003; C10M 2217/02; C10M 2229/041; C10M 2229/051; C10M 147/00; C10M 169/04; C08F 220/343; C08F 220/346; C08F 290/068; C08F 2800/20; C08F 220/24; C08F 220/22; C08F 220/305; C08F 230/08; C10N 2020/04; C10N 2030/18; C10N 2040/04; C10N 2040/25; C10N 2040/40; C10N 2040/00; C10N 2040/14; B01D 19/0409
See application file for complete search history.

(56) References Cited

U.S. PATENT DOCUMENTS

| | | | |
|---|---|---|---|
| 2008/0200608 A1 | 8/2008 | Burger et al. | |
| 2010/0076168 A1* | 3/2010 | Hara | C09K 3/22 |
| | | | 526/245 |
| 2011/0218137 A1 | 9/2011 | Rautschek et al. | |
| 2012/0208952 A1 | 8/2012 | Burger et al. | |
| 2018/0223219 A1* | 8/2018 | Takagi | C10M 159/005 |

FOREIGN PATENT DOCUMENTS

| | | |
|---|---|---|
| JP | 2000-87065 A | 3/2000 |
| JP | 2008-120889 A | 5/2008 |
| JP | 2008-542010 A | 11/2008 |
| JP | 2009-235252 A | 10/2009 |
| JP | 2012-509376 A | 4/2012 |
| JP | 2013-506551 A | 2/2013 |
| KR | 20170118607 | * 10/2017 |
| WO | 2008/055998 A1 | 5/2008 |

* cited by examiner

*Primary Examiner* — Cephia D Toomer
(74) *Attorney, Agent, or Firm* — Locke Lord LLP; James E. Armstrong, IV; Nicholas J. DiCeglie, Jr.

(57) ABSTRACT

Provided is a defoaming agent showing an excellent defoaming property. Specifically, the defoaming agent includes a polymer containing as a polymerization component a polymerizable monomer (1) having a urethane bond and a fluorine-containing functional group and/or a silicone chain-containing functional group.

18 Claims, No Drawings

DEFOAMING AGENT, LUBRICATING OIL COMPOSITION CONTAINING DEFOAMING AGENT, AND MACHINE USING LUBRICATING OIL COMPOSITION

TECHNICAL FIELD

The present invention relates to a defoaming agent, a lubricating oil composition containing a defoaming agent, and a machine using a lubricating oil composition.

BACKGROUND ART

In order to improve lubricity between members, lubricating oil is used in various machine apparatuses. However, when foaming occurs in the lubricating oil due to the friction between members, an increase in foaming may cause a lubrication defect, a hydraulic control defect, a decrease in cooling efficiency, etc. Therefore, control of foaming becomes a problem imposed on the lubricating oil.

For example, in driving parts of an automobile engine, transmission, axle unit, and the like, the load on the lubricating oil used in these parts is increased with recent improvements in performance and fuel saving. When high-load operation or high-speed running is continued, foaming in the lubricating oil is increased, and there may occur problems, such as the occurrence of hydraulic control defect due to the foam entrapped in a hydraulic flow passage; decreases in lubrication performance and cooling efficiency due to foaming; the occurrence of wearing and seizing due to the breakage of an oil film in a friction portion; and acceleration of deterioration of the lubricating oil due to an increase in oil temperature.

Therefore, lubricating oil having a high defoaming property is required so that foaming can be suppressed over a long period of time from the beginning of operation, and the lubricating oil contains a defoaming agent for preventing foaming. A polysiloxane-based defoaming agent is known as the defoaming agent, and various polysiloxane-based defoaming agents are proposed (Patent Literatures 1 to 3).

CITATION LIST

Patent Literature

PTL 1: Japanese Unexamined Patent Application Publication No. 2000-87065
PTL 2: Japanese Unexamined Patent Application Publication No. 2009-235252
PTL 3: Japanese Unexamined Patent Application Publication No. 2008-120889

SUMMARY OF INVENTION

Technical Problem

The lowering of viscosity of lubricating oil is advanced for achieving higher performance and fuel saving, and thus there is a problem that lubricating oil having low viscosity cannot be imparted with the satisfactory defoaming property by a usual polysiloxane-based defoaming agent.

A problem to be solved by the present invention is to provide a defoaming agent showing the excellent defoaming property.

Solution to Problem

As a result of earnest investigation for solving the problem, the inventors found that the excellent defoaming property can be obtained by a defoaming agent including a polymer containing, as a polymerization component, a polymerizable monomer (1) which has a urethane bond and a fluorine-containing functional group and/or a silicone chain-containing functional group.

That is, the present invention relates to a defoaming agent including a polymer containing, as a polymerization component, a polymerizable monomer (1) which has a urethane bond and a fluorine-containing functional group and/or a silicone chain-containing functional group.

Advantageous Effects of Invention

According to the present invention, a defoaming agent showing the excellent defoaming property can be provided.

DESCRIPTION OF EMBODIMENTS

An embodiment of the present invention is described below. The present invention is not limited to the embodiment below and can be carried out with a proper change within a range which does not impair the effect of the present invention.

In the present specification, "(meth)acrylate" represents either or both of "acrylate" and "methacrylate".

Defoaming Agent

A defoaming agent of the present invention includes a polymer containing, as a polymerization component, a polymerizable monomer (1) which has a urethane bond (—NH—C—(=O)—O—) and a fluorine-containing functional group and/or a silicone chain-containing functional group.

Herein, the "polymerization component" represents a component constituting the polymer and does not include a solvent, a polymerization initiator, etc., which do not constitute the polymer.

In the present invention, the "polymerizable monomer" represents a compound having a polymerizable unsaturated group, and examples of the polymerizable unsaturated group possessed by the polymerizable monomer (1) include a (meth)acryloyl group, a (meth)acryloyloxy group, a (meth)acryloylamide group, a vinyl ether group, an allyl group, a styryl group, a (meth)acryloylamino group, a maleimide group, and the like. Among these, a (meth)acryloyl group and a (meth)acryloyloxy group are preferred because of good availability of raw materials and polymerization reactivity.

In the polymerizable monomer (1), preferably, a urethane bond and a fluorine-containing functional group and/or a silicone chain-containing functional group are bonded to each other directly or through a linking group.

Examples of the fluorine-containing functional group possessed by the polymerizable monomer (1) include a fluorinated alkyl group having 1 to 6 carbon atoms, a group containing a poly(perfluoroalkylene ether) chain, and the like.

The poly(perfluoroalkylene ether) chain is a structure represented by general formula (PFPE) below, in which a divalent fluorinated hydrocarbon group and an oxygen atom are alternately linked to each other.

[Chem. 1]

(PFPE)

(In the general formula (PFPE),
Xs are each independently a perfluoroalkylene group, and n1 is a repeat number.)

In the structure represented by the general formula (PFPE), when X in the repeating unit parenthesized by n1 is two or more, the repeating unit portion parenthesized by n1 may be a random copolymer structure of the repeating unit parenthesized by n1 or a block copolymer structure of the repeating unit parenthesized by n1.

Examples of the perfluoroalkylene group as X include perfluoroalkylene groups (X-1) to (X-6) below.

[Chem. 2]

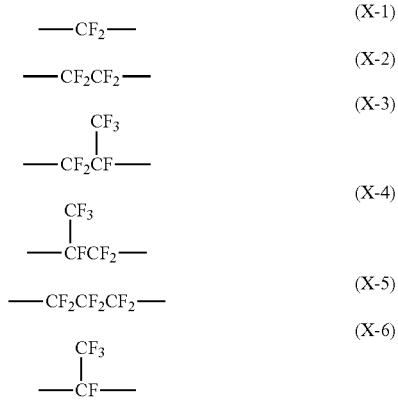

The perfluoroalkylene group as X is preferably a perfluoroalkylene group having 1 to 3 carbon atoms and more preferably a perfluoromethylene group or a perfluoroethylene group.

In the general formula (PFPE), both a perfluoromethylene group and a perfluoroethylene group are still more preferably present as X. When the perfluoromethylene group (X-1) and the perfluoroethylene group (X-2) coexist, the presence ratio (X-1/X-2) (number ratio) is preferably 1/10 to 10/1 and more preferably 3/10 to 10/3.

The repeat number as n1 is, for example, an integer within a range of 1 to 300, preferably an integer within a range of 2 to 200, more preferably an integer within a range of 3 to 100, still more preferably an integer within a range of 6 to 70, and most preferably an integer within a range of 12 to 50.

The silicone chain in the silicone chain-containing functional group possessed by the polymerizable monomer (1) is, for example, a group represented by general formula (SILICONE) below.

[Chem. 3]

(SILICONE)

(In the general formula (SILICONE),
Rs are each independently an alkyl group having 1 to 18 or a phenyl group, and
n2 is a repeat number.)

An alkyl group as R having 1 to 18 carbon atoms may be any one of a linear alkyl group, a branched alkyl group, and a cyclic alkyl group, and examples thereof include a methyl group, an ethyl group, a normal propyl group, an isopropyl group, a n-butyl group, a tert-butyl group, a n-hexyl group, a cyclohexyl group, a n-octyl group, a hexadecyl group, and the like.

The alkyl group as R having 1 to 18 carbon atoms is preferably an alkyl group having 1 to 6 carbon atoms and more preferably a methyl group.

The repeat number as n2 is, for example, an integer within a range of 1 to 200, and preferably an integer within a range of 1 to 150.

The number-average molecular weight of the silicone chain portion of the silicone chain-containing functional group is, for example, within a range of 100 to 20,000, preferably within a range of 400 to 18,000, more preferably within a range of 800 to 15,000, and still more preferably within a range of 1,000 to 12,000.

The polymerizable monomer (1) is preferably one or more selected from the group consisting of a compound represented by general formula (1-1) below and a compound represented by general formula (1-2) below.

[Chem. 4]

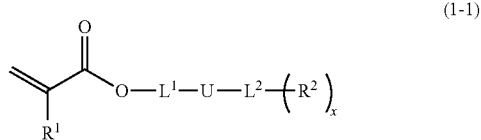

(1-1)

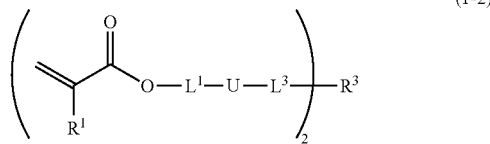

(1-2)

(In the general formulae (1-1) and (1-2),
$R^1$ is a hydrogen atom or a methyl group,
$L^1$ is a divalent organic group or a single bond,
$L^2$ is a divalent or trivalent organic group or a single bond,
$L^3$ is a divalent organic group or a single bond,
U is a urethane bond,
$R^2$ is a fluorine-containing functional group or a silicone chain-containing functional group,
$R^3$ is a divalent fluorine-containing functional group or a divalent silicone chain-containing functional group, and
x is an integer of 1 or 2.)

In the general formula (1-1), when x is 2, two Res may be the same as or different from each other. In the general formula (1-2), two parenthesized structures may be the same as or different from each other.

A divalent organic group as $L^1$ is preferably an alkylene group having 1 to 50 carbon atoms or an alkyleneoxy group having 1 to 50 carbon atoms.

Examples of the alkylene group as $L^1$ having 1 to 50 carbon atoms include a methylene group, an ethylene group, a n-propylene group, a n-butylene group, a n-pentylene group, a n-hexylene group, a n-heptylene group, a n-octylene group, a n-nonylene group, a n-decylene group, a n-dodecylene group, an isopropylene group, a 2-methylpropylene group, a 2-methylhexylene group, a tetramethylethylene group, and the like.

The alkylene group as $L^1$ having 1 to 50 carbon atoms is preferably an alkylene group having 1 to 15 carbon atoms, more preferably an alkylene group having 1 to 5 carbon atoms, and still more preferably a methylene group, an ethylene group, a n-propylene group, or an isopropylene group.

The alkyleneoxy group as $L^1$ having 1 to 50 carbon atoms is, for example, a group in which one or more —$CH_2$— in the alkylene group are substituted by —O—.

The alkyleneoxy group as $L^1$ having 1 to 50 carbon atoms is preferably an alkyleneoxy group having 1 to 15 carbon atoms, more preferably an alkyleneoxy group having 1 to 8 carbon atoms, and still more preferably a methyleneoxy group, an ethyleneoxy group, a propyleneoxy group, an oxytrimethylene group, a butyleneoxy group, an oxytetramethylene group, a pentyleneoxy group, a heptyleneoxy group, an octyleneoxy group, a dimethyleneoxy group, a diethyleneoxy group, or a dipropyleneoxy group.

When the divalent organic group $L^1$ is an alkylene group having 1 to 50 carbon atoms or an alkyleneoxy group having 1 to 50 carbon atoms, —$CH_2$— of the divalent organic group may be partially substituted by a carbonyl group (—C(=O)—) or a phenylene group, and, further, a hydroxyl group or the like may be substituted to a carbon atom.

Examples of the divalent organic group as $L^2$ include the same groups as those of the divalent organic group as $L^1$.

The trivalent organic group as $L^2$ is a group in which any one of hydrogen atoms in the divalent organic group is substituted by a bond, and is preferably a group in which any one of the hydrogen atoms in an alkylene group having 1 to 50 carbon atoms or an alkyleneoxy group having 1 to 50 carbon atoms is substituted by a bond.

Examples of the alkylene group having 1 to 50 carbon atoms and an alkyleneoxy group having 1 to 50 carbon atoms include the same groups as described above.

The silicone chain-containing functional group as $R^2$ is preferably a group represented by general formula (1-3) below.

[Chem, 5]

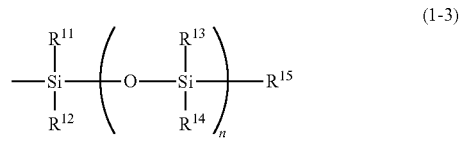

(In the general formula (1-3), $R^{11}$ is an alkyl group having 1 to 6 carbon atoms or a group represented by —$OSi(R^{16})_3$ ($R^{16}$ is each independently an alkyl group having 1 to 3 carbon atoms), $R^{12}$ is an alkyl group having 1 to 6 carbon atoms or a group represented by —$OSi(R^{17})_3$ ($R^{17}$ is each independently an alkyl group having 1 to 3 carbon atoms), $R^{13}$ is an alkyl group having 1 to 6 carbon atoms, $R^{14}$ is an alkyl group having 1 to 6 carbon atoms, $R^{15}$ is an alkyl group having 1 to 6 carbon atoms, and n is an integer of 0 or more.)

$R^{11}$, $R^{12}$, $R^{13}$, $R^{14}$, $R^{16}$, and $R^{17}$ are each preferably a methyl group, and $R^{15}$ is preferably an alkyl group having 1 to 6 carbon atoms.

The divalent fluorine-containing functional group as $R^3$ is preferably a group containing a poly(perfluoroalkylene ether) chain and more preferably a group represented by the general formula (PFPE).

The divalent silicone chain-containing functional group as $R^3$ is preferably a group represented by the general formula (SILICONE).

Examples of a compound represented by the general formula (1-2) in which $R^3$ is a group represented by the general formula (PFPE) include the followings.

[Chem. 6]

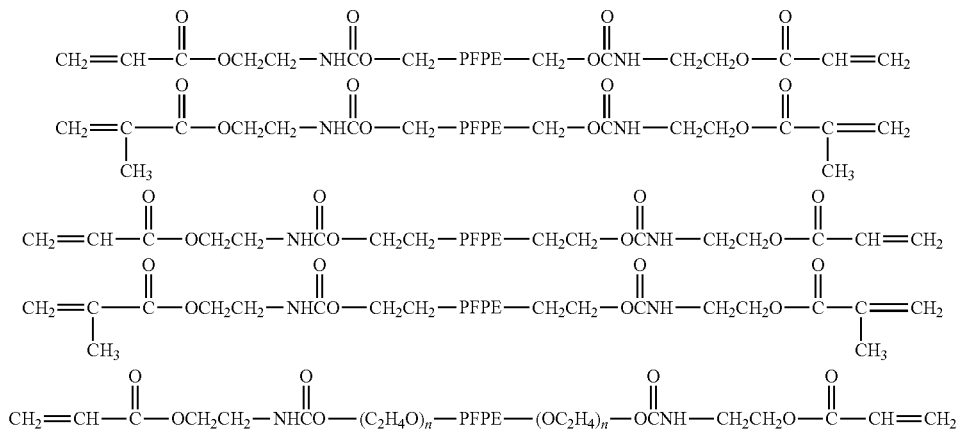

Examples of the divalent organic group as $L^3$ include the same groups as those of the divalent organic group as $L^1$.

The fluorine-containing functional group as $R^2$ is preferably a fluorinated alkyl group having 1 to 6 carbon atoms and more preferably a perfluoroalkyl group having 1 to 6 carbon atoms.

(n is each independently an integer within a range of 1 to 10.)

These polymerizable monomers (1) may be used alone or in combination of two or more.

The polymerizable monomer (1) can be produced by a known method.

For example, the polymerizable compound (1) can be produced by reacting a (meth)acrylate compound having an isocyanate group at an end with a compound having a hydroxyl group at either or both of the ends and having a fluorine-containing functional group and/or a silicone chain-containing functional group.

In the polymer containing the polymerizable monomer (1) as a polymerization component, the content ratio (simply referred to as the "content ratio of the polymerizable monomer (1)" hereinafter) of a structure derived from the polymerizable monomer (1) relative to the total amount of the polymer is, for example, 5% by mass or more, and preferably in the order of 10% by mass or more, 15% by mass or more, 20% by mass or more, 30% by mass or more, 50% by mass or more, 60% by mass or more, and 65% by mass or more.

The upper limit of the content ratio of the polymerizable monomer (1) is not particularly limited, but the content ratio relative to the total amount of the polymer is, for example, 95% by mass or less, and preferably in the order of 90% by mass or less, 80% by mass or less, and 75% by mass or less.

The content ratio of the polymerizable monomer (1) is a value (mass of the polymerizable monomer (1)/mass of the polymer) based on the mass of the polymer of the present invention and can be adjusted by a charge ratio of raw materials of the polymerizable monomer (1) for producing the polymer of the present invention.

The polymer containing the polymerizable monomer (1) as a polymerization component (may be simply referred to as the "polymer of the present invention" hereinafter) may have a portion other than the structure derived from the polymerizable monomer (1) as long as it contains the polymerizable monomer (1) as the polymerization component.

The polymer of the present invention is preferably used as a defoaming agent for a lubricating oil composition, and thus preferably has, as a portion other than the structure derived from the polymerizable monomer (1), a structure showing compatibility with a lubricant base oil and additives for lubricating oil, other than the defoaming agent, in the lubricating oil composition.

The polymer of the present invention preferably further contains, as a polymerization component other than the polymerizable monomer (1), a polymerizable monomer (2) having one or more selected from an alkyl group having 1 to 30 carbon atoms, an aromatic group having 6 to 20 carbon atoms, and a group containing a polyoxyalkylene chain.

Any one of an alkyl group having 1 to 30 carbon atoms, an aromatic group having 6 to 20 carbon atoms, and a group containing a polyoxyalkylene chain can exhibit high compatibility with a lubricant base oil or additives for lubricating oil, other than the defoaming agent.

The alkyl group having 1 to 30 carbon atoms possessed by the polymerizable monomer (2) may be any one of a linear alkyl group, a branched alkyl group, and a cyclic alkyl group, and examples thereof include a methyl group, an ethyl group, a normal propyl group, an isopropyl group, a n-butyl group, a tert-butyl group, a n-hexyl group, a cyclohexyl group, a n-octyl group, a hexadecyl group, an adamantyl group, a norbornyl group, a dicyclopentanyl group, a tricyclononyl group, a tricyclodecyl group, a tetracyclodecyl group, a stearyl group, and the like.

The alkyl group having 1 to 30 carbon atoms possessed by the polymerizable monomer (2) is preferably an alkyl group having 1 to 25 carbon atoms and more preferably a cyclic alkyl group having 3 to 14 carbon atoms.

Examples of the aromatic group having 6 to 20 carbon atoms possessed by the polymerizable monomer (2) include a phenyl group, a naphthyl group, an anthracen-1-yl group, a phenanthren-1-yl group, and the like.

The group containing a (poly)oxyalkylene chain possessed by the polymerizable monomer (2) is a monovalent group containing a repeating part of oxyalkylene or a group a divalent linking group containing a repeating part of oxyalkylene.

Examples of the polymerizable monomer (2) having an alkyl group having 1 to 30 carbon atoms and a (meth)acryloyl group as the polymerizable unsaturated group include (meth)acrylic acid alkyl esters having 1 to 18 carbon atoms, such as methyl (meth)acrylate, ethyl (meth)acrylate, n-propyl (meth)acrylate, isopropyl (meth)acrylate, n-butyl (meth)acrylate, s-butyl (meth)acrylate, isobutyl (meth)acrylate, tert-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, decyl (meth)acrylate, dodecyl (meth)acrylate, stearyl (meth)acrylate, isostearyl (meth)acrylate, and the like; and (meth)acrylic acid crosslinked cyclic alkyl esters having 3 to 18 carbon atoms, such as dicyclopentanyloxyethyl (meth)acrylate, isobornyloxyethyl (meth)acrylate, isobornyl (meth)acrylate, adamantyl (meth)acrylate, dimethyladamantyl (meth)acrylate, dicyclopentanyl (meth)acrylate, dicyclopentenyl (meth)acrylate, and the like.

Examples of the polymerizable monomer (2) having a phenylalkyl group having 7 to 20 carbon atoms or a phenoxyalkyl group 7 to 20 carbon atoms and a (meth)acryloyl group as the polymerizable unsaturated group include benzyl (meth)acrylate, 2-phenoxmethyl (meth)acrylate, 2-phenoxethyl (meth)acrylate, and the like.

Examples of the polymerizable monomer (2) having an alkyl group having 1 to 30 carbon atoms and a vinyl ether group as the polymerizable unsaturated group include alkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethyhexyl vinyl ether, cyclohexyl vinyl ether, and the like; cycloalkyl vinyl ethers; and the like.

Examples of the polymerizable monomer (2) having an aromatic group having 6 to 20 carbon atoms include styrene, α-methylstyrene, p-methylstyrene, p-methoxystyrene, and the like.

Examples of the polymerizable monomer (2) having an alkyl group having 1 to 30 carbon atoms and a (meth)acryloylamino group as the polymerizable unsaturated group include N,N-dimethylacrylamide, N,N-diethylacrylamide, N-isopropylacrylamide, diacetone acrylamide, acroylmorpholine, and the like.

Examples of the polymerizable monomer (2) having an alkyl group having 1 to 30 carbon atoms and a maleimide group as the polymerizable unsaturated group include methylmaleimide, ethyl maleimide, propylmaleimide, butylmaleimide, hexylmaleimide, octylmaleimide, dodecylmaleimide, stearylmaleimide, cyclohexylmaleimide, and the like.

Examples of the polymerizable monomer (2) having a group containing a polyoxyalkylene chain and a (meth)acryloyl group as the polymerizable unsaturated group include polypropylene glycol mono(meth)acrylate, polyethylene glycol mono(meth)acrylate, polytrimethylene glycol mono(meth)acrylate, polytetramethylene glycol mono(meth)acrylate, poly(ethylene glycol-propylene glycol) mono(meth)acrylate, polyethylene glycol-polypropylene glycol mono(meth)acrylate, poly(ethylene glycol-tetramethylene glycol) mono(meth)acrylate, polyethylene glycol-polytetramethylene glycol mono(meth)acrylate, poly(propylene glycol-tetramethylene glycol) mono(meth)acrylate, polypropylene glycol-polytetramethylene glycol mono(meth)acrylate, poly(propylene glycol-1,2-butylene glycol) mono(meth)acrylate, polypropylene glycol-poly1,2-butylene glycol mono(meth)acrylate, poly(ethylene glycol-1,2-butylene glycol) mono(meth)acrylate, polyethylene glycol-poly1,2-butylene glycol mono(meth)acrylate, poly(tetraethylene glycol-1,2-butylene glycol) mono(meth)acrylate, polytetraethylene glycol-poly-1,2-butylene glycol mono(meth)acrylate, poly-1,2-butylene glycol mono(meth)acrylate, poly(ethylene glycol-trimethylene glycol) mono(meth)acrylate, polyethylene glycol-polytrimethylene glycol mono(meth)acrylate, poly(propylene glycol-trimethylene glycol) mono(meth)acrylate, polypropylene glycol-polytrimethylene glycol mono(meth)acrylate, poly(trimethylene glycol-tetramethylene glycol) mono(meth)acrylate, polytrimethylene glycol-polytetramethylene glycol mono(meth)acrylate, poly(1,2-butylene glycol-trimethylene glycol) mono(meth)acrylate, poly-1,2-butylene glycol-polytrimethylene glycol mono(meth)acrylate, 2-hydroxyethyl (meth)acrylate, 2-hydroxypropyl (meth)acrylate, 2-hydroxybutyl (meth)acrylate, 4-hydroxybutyl (meth)acrylate, poly(1,2-butylene glycol-tetramethylene glycol) mono(meth)acrylate, poly-1,2-butylene glycol-polytetramethylene glycol mono(meth)acrylate, and the like.

The "poly(ethylene glycol-propylene glycol)" represents a random copolymer of ethylene glycol and propylene glycol, and the "polyethylene glycol-polypropylene glycol" represents a block copolymer of ethylene glycol and propylene glycol.

The polymerizable monomer (2) is preferably one or more selected from the group consisting of a compound represented by general formula (2-1) below and a compound represented by general formula (2-2) below.

When the polymer of the present invention is used as a defoaming agent of a lubricating oil composition, these compounds can exhibit compatibility with a lubricant base oil or additives for lubricating oil, other than the defoaming agent, in the lubricating oil composition.

[Chem. 7]

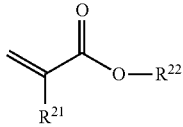
(2-1)

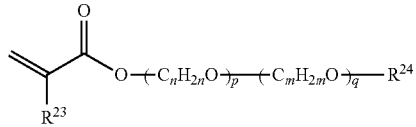
(2-2)

(In the formulae (2-1) and (2-2),
$R^{21}$ is a hydrogen atom or a methyl group,
$R^{22}$ is an alkyl group having 1 to 30 carbon atoms or a phenyl group,
$R^{23}$ is a hydrogen atom or a methyl group,
$R^{24}$ is a hydrogen atom, an alkyl group having 1 to 30 carbon atoms, or a phenyl group,
n is an integer within a range of 1 to 4,
m is an integer within a range of 1 to 4,
p and q are each independently an integer within a range of 0 to 200, and satisfy $p+q \geq 1$.)

In the compound represented by the general formula (2-2), a portion having a repeating unit parenthesized by p and a repeating unit parenthesized by q may be a random copolymer structure of the repeating unit parenthesized by p and the repeating unit parenthesized by q or may be a block copolymer structure of the repeating unit parenthesized by p and the repeating unit parenthesized by q.

These polymerizable monomers (2) may be used alone or in combination of two or more.

The polymerizable monomer (2) can be produced by a known method.

In addition, a commercial product may be used as the polymerizable monomer (2). Examples of a commercial product of the polymerizable monomer (2), which has a group containing a polyoxyalkylene chain and a (meth)acryloyl group as the polymerizable unsaturated group, include those manufactured by Shin-Nakamura Chemical Co., Ltd., such as "NK Ester M-20G", "NK Ester M-40G", "NK Ester M-90G", "NK Ester M-130G", "NK Ester M-230G", "NK Ester AM-90G", "NK Ester AMP-10G", "NK Ester AMP-20G", and "NK Ester AMP-60G"; those manufactured by NOF Corporation, such as "Blemmer PE-90", "Blemmer PE-200", "Blemmer PE-350", "Blemmer PME-100", "Blemmer PME-200", "Blemmer PME-400", "Blemmer PME-4000", "Blemmer PP-1000", "Blemmer PP-500", "Blemmer PP-800", "Blemmer 70PEP-350B", "Blemmer 55PET-800", "Blemmer 50POEP-800B", "Blemmer 10PPB-500B", "Blemmer NKH-5050", "Blemmer AP-400", and "Blemmer AE-350"; Plaxel F series manufactured by Daicel Chemical Industries, Ltd.; and the like.

When the polymer of the present invention is a copolymer containing the polymerizable monomer (1) and the polymerizable monomer (2) as polymerization components, the polymerization form of the copolymer is not particularly limited, and may be a random copolymer of the polymerizable monomer (1) and the polymerizable monomer (2) or a block copolymer of the polymerizable monomer (1) and the polymerizable monomer (2).

When the polymer of the present invention contains the polymerizable monomer (1) and the polymerizable monomer (2) as polymerization components, the mass ratio between the polymerizable monomer (1) and the polymerizable monomer (2) is for example, the polymerizable monomer (1):the polymerizable monomer (2)=within a range of 5:95 to 95:5, and is preferably the polymerizable monomer (1):the polymerizable monomer (2)=within a range of 10:90 to 80:20, and more preferably the polymerizable monomer (1):the polymerizable monomer (2)=within a range of 25:75 to 75:25.

The polymer of the present invention may contain as a polymerization component a polymerizable monomer other than the polymerizable monomer (1) and the polymerizable monomer (2) within a range not impairing the effect of the present invention as long as the polymer of the present invention is a copolymer containing the polymerizable monomer (1) and the polymerizable monomer (2) as polymerization components.

The polymer of the present invention is preferably a polymer substantially including the polymerizable monomer (1) and the polymerizable monomer (2) as polymerization components, and more preferably a polymer including only the polymerizable monomer (1) and any desired polymerizable monomer (2) as polymerization components. In this case, "substantially including" represents the case in which the content ratio of the total of the polymerizable monomer (1) and any desired polymerizable monomer (2) in the polymerization components is 80% by mass or more, 90% by mass or more, 95% by mass or more, or 99% by mass or more.

The number-average molecular weight (Mn) of the polymer of the present invention is preferably within a range of 500 to 50,000, more preferably within a range of 1,000 to 30,000, and still more preferably within a range of 1,500 to 10,000.

The weight-average molecular weight (Mw) of the polymer of the present invention is preferably within a range of 1,000 to 200,000, more preferably within a range of 1,500 to 150,000, still more preferably within a range of 2,000 to 100,000, and particularly preferably within a range of 3,000 to 50,000.

In the present invention, the weight-average molecular weight (Mw) and the number-average molecular weight (Mn) are values in terms of polystyrene based on gel permeation chromatography (GPC) measurement.

The values of the weight-average molecular weight (Mw) and the number-average molecular weight (Mn) of the polymer of the present invention are measured by a method described in examples.

Method for Producing Polymer

A method for producing the polymer of the present invention is not particularly limited, and the polymer can be produced by a known method.

The polymer of the present invention can be produced by a solution polymerization method, a bulk polymerization method, an emulsion polymerization method, or the like based on the polymerization mechanism of a radical polymerization method, a cationic polymerization method, an anionic polymerization method, or the like. For example, in the radial polymerization method, the polymer of the present invention can be produced by charging a mixture of polymerizable monomers in an organic solvent and adding a general-purpose radical polymerization initiator.

Various polymerization initiators can be used, and examples thereof include peroxides such as tert-butylperoxy-2-ethyl hexanoate, benzoyl peroxide, diacyl peroxide, and the like, azo compounds such as azobisisobutyronitrile, dimethyl azobisisobutyrate, phenyl azo triphenylmethane, and the like, metal chelate compounds such as $Mn(acac)_3$ and the like, and the like.

If required, a chain transfer agent such as lauryl mercaptan, 2-mercaptoethanol, ethylthioglycolic acid, octylthioglycolic acid, or the like, a thiol compound having a coupling group such as γ-mercaptopropyl trimethoxysilane or the like may be used as additives such as the chain transfer agent and the like.

Examples of the organic solvent include alcohols such as ethanol, isopropyl alcohol, n-butanol, iso-butanol, tert-butanol, and the like; ketones such as acetone, methyl ethyl ketone, methyl isobutyl ketone, methyl amyl ketone, and the like; esters such as methyl acetate, ethyl acetate, butyl acetate, methyl lactate, ethyl lactate, butyl lactate, and the like; monocarboxylic acid esters such as methyl 2-oxypropionate, ethyl 2-oxypropionate, propyl 2-oxypropionate, butyl 2-oxypropionate, methyl 2-methoxypropionate, ethyl 2-methoxypropionate, propyl 2-methoxypropionate, butyl 2-methoxypropionate, and the like; polar solvents such as dimethylformamide, dimethyl sulfoxide, N-methylpyrrolidone, and the like; ethers such as methyl cellosolve, cellosolve, butyl cellosolve, butyl carbitol, ethyl cellosolve acetate, and the like; propylene glycols and esters thereof, such as propylene glycol, propylene glycol monomethyl ether, propylene glycol monomethyl ether acetate, propylene glycol monoethyl ether acetate, propylene glycol monobutyl ether acetate, and the like; halogen-based solvents such as 1,1,1-trichloroethane, chloroform, and the like; ethers such as tetrahydrofuran, dioxane, and the like; aromatics such as benzene, toluene, xylene, and the like; fluorinated inert liquids such as perfluorooctane, perfluorotri-n-butylamine, and the like; and the like.

These solvents can be used alone or in combination of two or more.

The polymer of the present invention can also be produced by living polymerization such as living radical polymerization, living anionic polymerization, or the like.

In the living radical polymerization, dormant species protected by atoms or atomic groups at the active polymerization ends reversibly generate radicals and react with a monomer, thereby causing growth reaction to proceed. Even when a first monomer is consumed, the growth end does not lose activity and reacts with a sequentially added second monomer, and thus a block polymer can be produced. Examples of the living radical polymerization include atom transfer radical polymerization (ATRP), reversible addition-fragmentation radical polymerization (RAFT), nitroxide-mediated radical polymerization (NMP), organotellurium-mediated radical polymerization (TERP), and the like. Among these, which of the methods is used is not particularly limited, but ATRP is preferred in view of the ease of control or the like. ATRP is polymerization using an organic halide or sulfonyl halide compound as a polymerization initiator and, as a catalyst, a metal complex composed of a transition metal compound and a ligand.

Specific examples of the polymerization initiator which can be used for ATRP include 1-phenylethyl chloride, 1-phenylethyl bromide, chloroform, carbon tetrachloride, 2-chloropropionitrile, α,α'-dichloroxylene, α,α'-dibromoxylene, hexakis(α-bromomethyl) benzene, alkyl esters (having 1 to 6 carbon atoms) of 2-halogenated carboxylic acids having 1 to 6 carbon atoms (for example, 2-chloropropionic acid, 2-bromopropionic acid, 2-chloroisobutyric acid, 2-bromoisobutyric acid, and the like), and the like.

More specific examples of alkyl esters (having 1 to 6 carbon atoms) of 2-halogenated carboxylic acids having 1 to 6 carbon atoms include methyl 2-chloropropinate, ethyl 2-chloropropionate, methyl 2-bromopropionate, ethyl 2-bromoisobutyrate, and the like.

The transition metal compound which can be used for ATRP is represented by $M^{n+}X_n$.

Examples of transition metal $M^{n+}$ of the transition metal compound represented by $M^{n+}X_n$ can be selected from the group consisting of $Cu^+$, $Cu^{2+}$, $Fe^{2+}$, $Fe^{3+}$, $Ru^{2+}$, $Ru^{3+}$, $Cr^{2+}$, $Cr^{3+}$, $Mo^0$, $Mo^+$, $Mo^{2+}$, $Mo^{3+}$, $W^{2+}$, $W^{3+}$, $Rh^{3+}$, $Rh^{4+}$, $Co^+$, $Co^{2+}$, $Re^{2+}$, $Re^{3+}$, $Ni^0$, $Ni^+$, $Mn^{3+}$, $Mn^{4+}$, $V^{2+}$, $V^{3+}$, $Zn^+$, $Zn^{2+}$, $Au^+$, $Au^{2+}$, $Ag^+$, and $Ag^{2+}$.

X of the transition metal compound represented by $M^{n+}X_n$ can be selected from the group consisting of a halogen atom, an alkoxyl group having 1 to 6 carbon atoms, $(SO_4)_{1/2}$, $(PO_4)_{1/3}$, $(HPO_4)_{1/2}$, $(H_2PO_4)$, triflate, hexafluorophosphate, methanesulfonate, aryl sulfonate (preferably, benzenesulfonate or toluenesulfonate), $SeR^{11}$, CN, and $R^{12}COO$. Herein, $R^{11}$ represents an aryl group or a linear or branched alkyl group having 1 to 20 carbon atoms (preferably 1 to 10 carbon atoms), and $R^{12}$ represents a hydrogen atom or a linear or branched alkyl group (preferably a methyl group) having 1 to 6 carbon atoms, which may be substituted 1 to 5 times by halogen (preferably 1 to 3 times by fluorine or chlorine).

In the transition metal compound represented by $M^{n+}X_n$, n represents the formal charge on metal and is an integer or 0 to 7.

Examples of a ligand compound which can coordinate to the transition metal of the transition metal compound include a compound having a ligand containing one or more nitrogen atoms, oxygen atoms, phosphorus atoms, or sulfur atoms, which can coordinate to a transition metal through σ bonding, a compound having a ligand containing two or more carbon atoms, which can coordinate to a transition metal through n bonding, and a compound having a ligand which can coordinate to a transition metal through μ bonding or η bonding.

The transition metal complex is not particularly limited, but is preferably a 7, 8, 9, 10, or 11 group transition metal complex, and more preferably a o-valent copper, monovalent copper, divalent ruthenium, divalent iron, or divalent nickel complex.

When the center metal is copper, examples of the catalyst which can be used for ATRP include complexes with ligands such as 2,2'-bipyridyl and derivatives thereof, 1,10-phenanthroline and derivatives thereof, and polyamines such as tetramethyl ethylenediamine, pentamethyl diethylenetriamine, hexamethyl tris(2-aminoethyl)amine, and the like. Examples of a divalent ruthenium complex include dichlorotris(triphenylphosphine)ruthenium, dichlorotris(tributylphosphine)ruthenium, dichloro(cyclooctadiene)ruthenium, dichlorobenzene ruthenium, dichloro-p-cymene ruthenium, dichloro(norbornadiene)ruthenium, cis-dichlorobis(2,2'-bipyridine)ruthenium, dichlorotris(1,10-phenanthroline)ruthenium, carbonylchlorohydride tris(triphenylphosphine)ruthenium, and the like. Further, examples of a divalent iron complex include bistriphenylphosphine complex, a triaza cyclononane complex, and the like.

The living radical polymerization preferably uses a solvent.

Examples of the solvent used in the living radical polymerization include ester-based solvents such as ethyl acetate, butyl acetate, propylene glycol monomethyl ether acetate, and the like; ether-based solvents such as diisopropyl ether, dimethoxyethane, diethylene glycol dimethyl ether, and the like; halogen-based solvents such as dichloromethane, dichloroethane, and the like; aromatic solvents such as toluene, xylene, and the like; ketone-based solvents such as methyl ethyl ketone, methyl isobutyl ketone, cyclohexanone, and the like; alcohol-based solvents such as methanol, ethanol, isopropanol, and the like; aprotic polar solvents such as dimethylformamide, dimethyl sulfoxide, and the like; and the like.

The above solvents may be used alone or in combination of two or more.

The polymerization temperature of the living radical polymerization is preferably within a range of room temperature to 120° C.

When the polymer of the present invention is produced by the living radical polymerization, a metal originated from the transition metal compound used for polymerization may remain in the resultant polymer. The metal remaining in the resultant polymer may be removed by using active alumina or the like after the completion of polymerization.

[Lubricating Oil Composition]

The defoaming agent of the present invention can be preferably used as a defoaming agent for a lubricating oil composition, and the lubricating oil composition of the present invention contains the defoaming agent of the present invention.

The defoaming agent of the present invention has the high defoaming performance and can be used without limit for a lubricating oil composition for driving-system apparatuses, for example, an automobile buffer, a transmission, a power steering, and the like.

The content ratio of the defoaming agent of the present invention in the lubricating oil composition of the present invention is not particularly limited, and the ratio in the total amount of the lubricating oil composition is, for example, within a range of 1 to 1000 ppm by mass, preferably within a range of 5 to 700 ppm by mass, and more preferably within a range of 10 to 400 ppm by mass.

A known lubricant base oil can be used for the lubricating oil composition of the present invention, and any one of mineral oil, synthetic oil, and mixed oil of mineral oil and synthetic oil may be used.

The mineral oil is, for example, mineral oil produced by purifying the lubricating oil distillate obtained by vacuum distillation of the atmospheric residue, which is obtained by atmospheric distillation of crude oil, by one or more treatments of solvent deasphalting, solvent extraction, hydrocracking, solvent dewaxing, contact dewaxing, hydrogenation refining, and the like. Examples thereof include paraffin-based mineral oil, naphthene-based mineral oil, and the like.

Other examples include mineral oil produced by isomerizing mineral-based wax or wax (GTL wax), produced by the Fischer-Tropsch process, and the like.

Examples of the synthetic oil include polyolefin such as polybutene, α-olefin homopolymer and copolymer (for example, ethylene-α-olefin copolymer), and the like; various esters such as polyol ester, dibasic acid esters, phosphoric acid esters, various ethers such as polyphenyl ether and the like; polyglycol; alkyl benzene; alkylnaphthalene; and the like.

These lubricant base oils may be used alone or in combination of two or more.

The dynamic viscosity at 100° C. of the lubricant base oil is preferably within a range of 2 to 15 mm$^2$/s, more preferably within a range of 2 to 10 mm$^2$/s, and still more preferably within a range of 3 to 5 mm$^2$/s.

The lubricant base oil having a dynamic viscosity at 100° C. within the range described above causes little evaporation loss and not too large power loss by viscous resistance, and thus a fuel efficiency improving effect can be easily obtained.

The paraffin content (may be described as "% Cp") of the lubricant base oil, which is determined by n-d-M ring analysis, is preferably 70% or more, more preferably 75% or more, and still more preferably 80% or more.

The lubricant base oil having a paraffin content within the range described above has good oxidation stability and the like.

The content ratio of the lubricant base oil in the lubricating oil composition is, for example, within a range of 65% to 95% by mass, preferably within a range of 70% to 95% by mass, and more preferably within a range of 70% to 90% by mass, in the total amount of the lubricating oil composition.

The lubricating oil composition of the present invention may further contain other additives as long as it contains the defoaming agent of the present invention and the lubricant base oil.

Additives which may be contained as the other additives include an ashless cleaning agent, an ashless friction modifier, an antiwear agent, an extreme pressure agent, a viscosity index improver, a metal deactivator, a pour-point depressant, an antirust agent, and the like. These additives may be used alone or in combination of two or more.

The content of each of the other additives can be properly adjusted within a range not impairing the effect of the present invention, and the content based on the total amount of the lubricating oil composition is generally 0.001% to 25% by mass, preferably 0.005% to 20% by mass, and more preferably 0.01% to 15% by mass.

The total content of the other additives based on the total amount of the lubricating oil composition is preferably 25% by mass or less, more preferably 20% by mass or less, and still more preferably 15% by mass or less.

Examples of the ashless cleaning agent include alkenyl succinic acid imide such as alkenyl succinic acid monoimide, alkenyl succinic acid bisimide, and the like, boron-modified alkenyl succinic acid imide, and the like.

Examples of the ashless friction modifier include an aliphatic amine, a fatty acid ester, a fatty acid amide, a fatty acid, an aliphatic alcohol, an aliphatic ether, and the like, each of which has at least one alkyl group or alkenyl group having 6 to 30 carbon atoms in its molecule.

Examples of the antiwear agent or extreme pressure agent include sulfur-containing compounds such as zinc dithiophosphate, and the like; phosphorus-containing compounds such as phosphite esters, phosphate esters, phosphonate esters, amine salts or metal salts thereof, and the like; and sulfur- and phosphorus-containing antiwear agents such as thiophosphite esters, thiophosphate esters, thiophosphonate esters, amine salts or metal salts thereof, and the like.

Examples of the viscosity index improver include polymethacrylate, dispersed polymethacrylate, olefinic copolymers (for example, ethylene-propylene copolymer and the like), dispersed olefinic copolymers, styrene copolymers (for example, styrene-diene copolymer, styrene-isoprene copolymer, and the like), and the like.

Examples of the metal deactivator include a benzotriazole-based compound, a tolyltriazole-based compound, an imidazole-based compound, a pyrimidine-based compound, and the like.

Examples of the pour-point depressant include an ethylene-vinyl acetate copolymer, a condensate of chlorinated paraffin and naphthalene, a condensate of chlorinated paraffin and phenol, polymethacrylate, polyalkylstyrene, and the like.

Examples of the anti-rust agent include petroleum sulfonate, alkylbenzene sulfonate, dinonylnaphthalene sulfonate, alkenyl succinic acid esters, polyhydric alcohol esters, and the like.

EXAMPLES

The present invention is specifically described by examples and comparative examples below.

The present invention is not limited to the examples below.

In the examples and comparative examples, the weight-average molecular weight (Mw) and the number-average molecular weight (Mn) are values in terms of polystyrene based on gel permeation chromatography (GPC) measurement.

The GPC measurement conditions are as follows.
[GPC Measurement Conditions]
Measurement apparatus: high-speed GPC apparatus "HLC-8320GPC" manufactured by Tosoh Corporation
Column: "TSK GUARDCOLUMN SuperHZ-L" manufactured by Tosoh Corporation+"TSK gel SuperHZM-N" manufactured by Tosoh Corporation+"TSK gel SuperHZM-N" manufactured by Tosoh Corporation+"TSK gel SuperHZM-N" manufactured by Tosoh Corporation+"TSK gel SuperHZM-N" manufactured by Tosoh Corporation
Detector: RI (differential refractometer)
Data processing: "EcoSEC Data Analysis version 1.07" manufactured by Tosoh Corporation
Colum temperature: 40° C.
Developing solvent: tetrahydrofuran
Flow rate: 0.35 mL/min
Measurement sample: The measurement sample was formed by dissolving 7.5 mg of a sample in 10 ml of tetrahydrofuran and then filtering the resultant solution with a microfilter.
Sample injection amount: 20 μL
Standard sample: Monodisperse polystyrene below having a known molecular weight was used according to the measurement manual of "HLC-8320GPC".
(Monodisperse Polystyrene)
"A-300" manufactured by Tosoh Corporation
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation Synthesis Example 1: Synthesis of Polymerizable Monomer (I) having Urethane Bond and Fluorine-Containing Functional Group In a glass flask provided with a stirrer, a thermometer, a condenser, a dropping device, 100 parts by mass of 2-(perfluorohexyl)ethanol, 100 parts by mass of 1,3-bis(trifluoromethyl)benzene as a solvent, and 0.03 parts by mass of stannous octylate as a catalyst were charged. Then, stirring was started in air stream, and the temperature in the flask was increased to 75° C. Then, 42.2 parts by mass of 2-isocyanatoethyl methacrylate was dropped over 40 minutes. After the completion of dropping, reaction was performed by heating to 80° C. and stirring for 1 hour.

As a result of IR spectral measurement of the resultant reaction product, the disappearance of an absorption peak of isocyanate group was confirmed. Thus, a polymerizable monomer (I) represented by general formula (I) below having a urethane bond and a fluorine-containing functional group was obtained.

[Chem. 8]

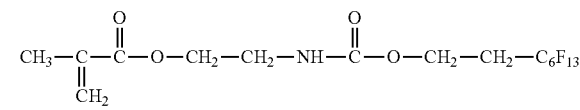

(I)

Synthesis Example 2: Synthesis of Polymerizable Monomer (II) Having Urethane Bond and Fluorine-Containing Functional Group A polymerizable monomer (II) represented by general formula (II) below having a urethane bond and a fluorine-containing functional group was synthesized by the same method as in Synthesis Example 1 except that a fluorine compound represented by formula (A) below was used in place of 2-(perfluorohexyl)ethanol.

{Chem. 9}

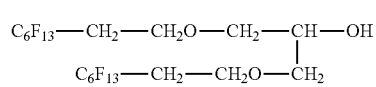

(A)

[Chem. 10]

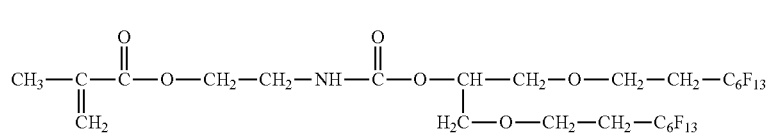

(II)

Synthesis Example 3: Synthesis of Polymerizable Monomer (III) Having Urethane Bond and Fluorine-Containing Functional Group A polymerizable monomer (III) represented by general formula (III) below having a urethane bond and a fluorine-containing functional group was synthesized by the same method as in Synthesis Example 1 except that 2-(perfluorobutyl)ethanol was used in place of 2-(perfluorohexyl)ethanol.

[Chem. 11]

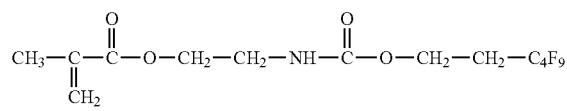

(III)

Synthesis Example 4: Synthesis of Polymerizable Monomer (IV) Having Urethane Bond and Silicone-Containing Functional Group A polymerizable monomer (IV) represented by general formula (IV) below having a urethane bond and a silicone-containing functional group was synthesized by the same method as in Synthesis Example 1 except that a silicone compound represented by formula (B) below was used in place of 2-(perfluorohexyl)ethanol.

{Chem. 12}

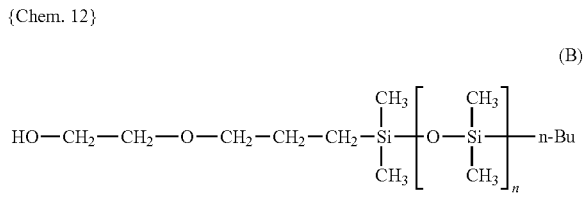

(B)

(The repeating part n is bout 65.)

[Chem. 13]

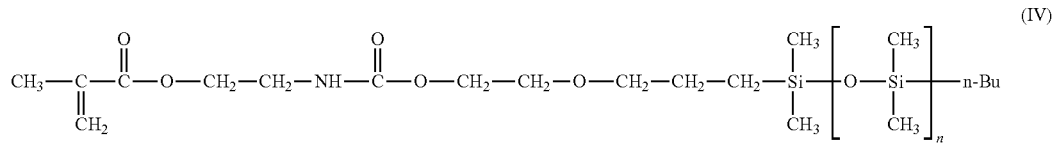

(IV)

Example 1: Synthesis of Defoaming Agent (1)

In a glass flask provided with a stirrer, a thermometer, a condenser, a dropping device, 100 parts by mass of n-butyl acetate as a solvent was charged and heated to 110° C. under stirring in a nitrogen stream. In addition, 56.5 parts by mass of the polymerizable monomer (I) of Synthesis Example 1 was dissolved in 54.3 parts by mass of 1,3-bis(trifluoromethyl)benzene, and 33.5 parts by mass of methoxypolyethylene glycol methacrylate (repat number of ethylene oxide chain: about 23) and 10 parts by mass of dicyclopentanyl acrylate were dissolved in 210 parts by mass of n-butyl acetate. Further, 15 parts by mass of tert-butylperoxy-2-ethyl hexanoate as a radical polymerization initiator was dissolved in 35 parts by mass of n-butyl acetate. Preparing a polymerization initiator solution. Then, the resultant three dropping solutions were set to respective dropping devices and simultaneously dropped over 2 hours while the inside of the flask was kept at 110° C. After the completion of dropping, the resultant mixture was stirred at 110° C. for 5 hours, thereby producing a solution of defoaming agent (1) which was a polymer having a urethane bond and a fluorine-containing functional group.

As a result of GPC measurement of the molecular weight of the resultant defoaming agent (1), the weight-average molecular weight (Mw) was 7,300, and the number-average molecular weight (Mn) was 2,900.

Example 2: Synthesis of Defoaming Agent (2)

In a glass flask provided with a stirrer, a thermometer, a condenser, a dropping device, 204.1 parts by mass of propylene glycol monomethyl ether acetate as a solvent was charged and heated to 92° C. under stirring in a nitrogen stream. In addition, 115.3 parts by mass of the polymerizable monomer (II) of Synthesis Example 2 dissolved in 76.9 parts by mass of methyl isobutyl ketone, 68.4 parts by mass of methoxypolyethylene glycol methacrylate (repat number of ethylene oxide chain: about 23), and 20.4 parts by mass of dicyclopentanyl acrylate were dissolved in 158.3 parts by mass of propylene glycol monomethyl ether acetate, preparing a monomer solution. Further, 10.2 parts by mass of dimethyl 2,2'-azobisbutylate as a radical polymerization initiator was dissolved in 91.8 parts by mass of propylene glycol monomethyl ether acetate, preparing a polymerization initiator solution. Then, the resultant two dropping solutions were set to respective dropping devices and simultaneously dropped over 4 hours while the inside of the flask was kept at 92° C. After the completion of dropping, the mixture was stirred at 92° C. for 2 hours, and then a polymerization initiator solution prepared by dissolving 2 parts by mass of dimethyl 2,2'-azobisbutylate as a radical polymerization initiator in 4.8 parts by mass of propylene glycol monomethyl ether acetate was dropped over 15 minutes. After the completion of dropping, the mixture was stirred at 92° C. for 2 hours, thereby producing a solution of defoaming agent (2) which was a polymer having a urethane bond and a fluorine-containing functional group.

As a result of GPC measurement of the molecular weight of the resultant defoaming agent (2), the weight-average molecular weight (Mw) was 7,600, and the number-average molecular weight (Mn) was 3,200.

Example 3: Synthesis of Defoaming Agent (3)

In a glass flask provided with a stirrer, a thermometer, a condenser, a dropping device, 30 parts by mass of n-butyl acetate as a solvent was charged and heated to 105° C. under stirring in a nitrogen stream. In addition, 33 parts by mass of the polymerizable monomer (III) of Synthesis Example 3 dissolved in 39.5 parts by mass of n-butyl acetate, 3 parts by mass of dicyclopentany acrylate, 45 parts by mass of n-butyl acetate, and 13 parts by mass of methoxypolyethylene glycol methacrylate (repat number of ethylene oxide chain: about 9) was dissolved in 45 parts by mass of n-butyl acetate, preparing a monomer solution, Further, 1.5 parts by mass of tert-butylperoxy-2-ethyl hexanoate as a radical polymerization initiator was dissolved in 15 parts by mass of n-butyl acetate, preparing a polymerization initiator solution. Then, the resultant two dropping solutions were set to respective dropping devices and simultaneously dropped over 2 hours while the inside of the flask was kept at 105° C. After the completion of dropping, the mixture was stirred at 105° C. for 3 hours, thereby producing a solution of defoaming agent (3) which was a polymer having a urethane bond and a silicone chain-containing functional group.

As a result of GPC measurement of the molecular weight of the resultant defoaming agent (3), the weight-average molecular weight (Mw) was 9,400, and the number-average molecular weight (Mn) was 2,700.

Example 4: Synthesis of Defoaming Agent (4)

In a glass flask provided with a stirrer, a thermometer, a condenser, a dropping device, 30 parts by mass of n-butyl acetate as a solvent was charged and heated to 105° C. under stirring in a nitrogen stream. In addition, 25 parts by mass of the polymerizable monomer (IV) of Synthesis Example 4 and 20 parts by mass of methoxypolyethylene glycol methacrylate (repat number of ethylene oxide chain: about 9) were dissolved in 60 parts by mass of n-butyl acetate, preparing a monomer solution. Further, 0.45 parts by mass of tert-butylperoxy-2-ethyl hexanoate as a radical polymerization initiator was dissolved in 15 parts by mass of n-butyl acetate, preparing a polymerization initiator solution. Then, the resultant two dropping solutions were set to respective dropping devices and simultaneously dropped over 2 hours while the inside of the flask was kept at 105° C. After the completion of dropping, the mixture was stirred at 105° C. for 5 hours, thereby producing a solution of defoaming agent (4) which was a polymer having a urethane bond and a silicone chain-containing functional group.

As a result of GPC measurement of the molecular weight of the resultant defoaming agent (4), the weight-average molecular weight (Mw) was 26,800, and the number-average molecular weight (Mn) was 2,500.

Comparative Example 1: Synthesis of Defoaming Agent (1')

In a glass flask provided with a stirrer, a thermometer, a condenser, a dropping device, 200 parts by mass of n-butyl acetate as a solvent was charged and heated to 110° C. under stirring in a nitrogen stream. In addition, 104 parts by mass of 2-(perfluorohexyl)ethyl methacrylate dissolved in 530 parts by mass of n-butyl acetate, 72 parts by mass of methoxypolyethylene glycol methacrylate (repat number of ethylene oxide chain: about 23), and 22 parts by mass of dicyclopentanyl acrylate were dissolved in 530 parts by mass of n-butyl acetate, preparing a monomer solution. Further, 30 parts by mass of tert-butylperoxy-2-ethyl hexanoate as a radical polymerization initiator was dissolved in 70 parts by mass of n-butyl acetate, preparing a polymerization initiator solution. Then, the resultant two dropping solutions were set to respective dropping devices and simultaneously dropped over 2 hours while the inside of the flask was kept at 110° C. After the completion of dropping, the mixture was stirred at 110° C. for 5 hours, thereby producing a solution of defoaming agent (1') which was a polymer having a fluorine-containing functional group but not having a urethane bond.

As a result of GPC measurement of the molecular weight of the resultant defoaming agent (1'), the weight-average molecular weight (Mw) was 7,200, and the number-average molecular weight (Mn) was 2,700.

Comparative Example 2: Synthesis of Defoaming Agent (2')

In a glass flask provided with a stirrer, a thermometer, a condenser, a dropping device, 20 parts by mass of n-butyl acetate as a solvent was charged and heated to 105° C. under stirring in a nitrogen stream. In addition, 25 parts by mass of a compound represented by formula (C) below and 20 parts by mass of methoxypolyethylene glycol methacrylate (repat number of ethylene oxide chain: about 9) were dissolved in 70 parts by mass of n-butyl acetate, preparing a monomer solution. Further, 0.45 parts by mass of tert-butylperoxy-2-ethyl hexanoate as a radical polymerization initiator was dissolved in 15 parts by mass of n-butyl acetate, preparing a polymerization initiator solution. Then, the resultant two dropping solutions were set to respective dropping devices and simultaneously dropped over 2 hours while the inside of the flask was kept at 105° C. After the completion of dropping, the mixture was stirred at 105° C. for 5 hours, thereby producing a solution of defoaming agent (2') which was a polymer having a silicone chain-containing functional group but not having a urethane bond.

[Chem. 14]

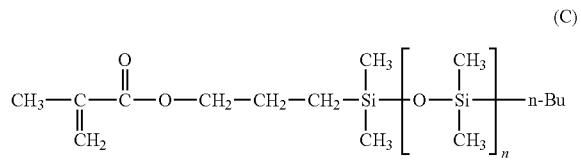

(C)

(The repeating part n is about 65.)

As a result of GPC measurement of the molecular weight of the resultant defoaming agent (2'), the weight-average molecular weight (Mw) was 17,800, and the number-average molecular weight (Mn) was 2,300.

Commercially available dimethyl silicone ("KF-96-60, 000cs" manufactured by Shin-Etsu Silicone Co., Ltd.) represented below was separately prepared as a defoaming agent Si.

[Chem. 15]

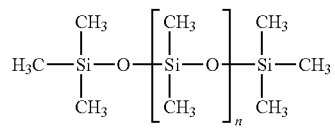

The defoaming performance of the defoaming agent was evaluated by a foaming test below using each of the defoaming agents produced as described above. The results are shown in Table 1.

(Preparation of Lubricating Oil Composition)

Each of the defoaming agents shown in Table 1 was added in an amount shown in Tables 1 and 2 to 100 parts by mass of a base lubricating oil containing a lubricant base oil (paraffin-based mineral oil) as a main component and small amounts of various additives (a viscosity index improver, a phosphite ester compound, a thiadiazole compound, a calcium-based cleaning agent, a metal deactivator, an ashless dispersant, an antioxidant, etc.), preparing a lubricating oil composition.

A foaming test below was performed for the resultant lubricating oil composition. The results are shown in Tables 1 and 2.

(Foaming Test)

The foaming test was performed according to the homogenizer method disclosed in Japanese Unexamined Patent Application Publication No. 2008-120880.

The lubricating oil composition was stirred by using a homogenizer ("T. K. Robomix" manufactured by Primix Corporation) provided with generator shaft ("Mini Mixer" manufactured by Primix Corporation) according to conditions described below. A foaming amount (mL) was determined by subtracting the reading (mL) of the oil surface before stirring from the reading (mL) of the foaming surface 3 seconds after the completion of stirring. A smaller foaming amount indicates the more excellent defoaming property.

Rotational speed: 16,000 rpm
Oil temperature: 120° C. or 130° C.
Oil amount: 80 ml
Vessel: 200 ml measuring cylinder (inner diameter ϕ: 36 mm)
Stirring time: 1 minute

TABLE 1

|  | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Defoaming agent | | Defoaming agent (1) | Defoaming agent (2) | Defoaming agent (3) | Defoaming agent (4) | Defoaming agent (1') | Defoaming agent (2') | Defoaming agent Si | — |
| Adding amount [mass ppm] | | 100 | 100 | 100 | 100 | 100 | 100 | 100 | — |
| Foaming amount [mL] | 120° C. | 4 | 6 | 2 | 26 | 40 | 40 | 80 | 46 |
|  | 130° C. | 10 | 16 | 0 | 32 | 46 | 44 | 84 | 46 |

TABLE 2

| | Example 5 | Example 6 | Comparative Example 5 | Comparative Example 6 |
|---|---|---|---|---|
| Defoaming agent | Defoaming agent (1) | Defoaming agent (2) | Defoaming agent (1') | Defoaming agent Si |
| Adding amount [mass ppm] | 20 | 20 | 20 | 20 |
| Foaming amount [mL] 120° C. | 10 | 8 | 46 | 60 |
| 130° C. | 20 | 20 | 48 | 60 |

The results of Tables 1 and 2 indicate that with the lubricating oil composition using each of the defoaming agents (1) to (4), which are defoaming agents of the present invention, the foaming amount is significantly decreased as compared with the lubricating oil composition of Comparative Example 4 to which the foaming agent is not added. On the other hand, it is found that with the lubricating oil compositions using the defoaming agent (1') and defoaming agent (2'), which do not have a urethane bond, the foaming amount is smaller than that of the lubricating oil composition of Comparative Example 4, to which the defoaming agent is not added, but the effect of decreasing the defoaming amount is not so large as the defoaming agents (1) to (4).

The invention claimed is:

1. A defoaming agent comprising a polymer containing as a polymerization component a polymerizable monomer (1) that is one or more selected from the group consisting of a compound represented by general formula (1-1) below and a compound represented by general formula (1-2) below,

[Chem. 1]

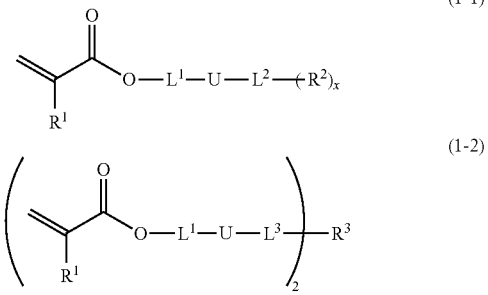

in the general formulae (1-1) and (1-2),
$R^1$ is a hydrogen atom or a methyl group,
$L^1$ is a divalent organic group or a single bond,
$L^2$ is a divalent or trivalent organic group or a single bond,
$L^3$ is a divalent organic group or a single bond,
U is a urethane bond,
$R^2$ is a fluorine-containing functional group or a silicone chain-containing functional group,
$R^3$ is a divalent fluorine-containing functional group or a divalent silicone chain-containing functional group, and
x is an integer of 1 or 2.

2. The defoaming agent according to claim 1, wherein the fluorine-containing functional group as $R^2$ is a fluorinated alkyl group having 1 to 6 carbon atoms.

3. The defoaming agent according to claim 1, wherein the silicone chain-containing functional group as $R^2$ is a group represented by general formula (1-3) below,

[Chem. 2]

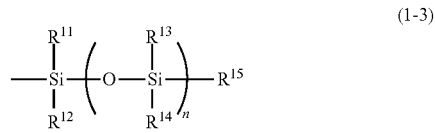

in the general formula (1-3),
$R^{11}$ is an alkyl group having 1 to 6 carbon atoms or a group represented by $-OSi(R^{16})_3$ with $R^{16}$ being each independently an alkyl group having 1 to 3 carbon atoms,
$R^{12}$ is an alkyl group having 1 to 6 carbon atoms or a group represented by $-OSi(R^{17})_3$ with $R^{17}$ being each independently an alkyl group having 1 to 3 carbon atoms,
$R^{13}$ is an alkyl group having 1 to 6 carbon atoms,
$R^{14}$ is an alkyl group having 1 to 6 carbon atoms,
$R^{15}$ is an alkyl group having 1 to 6 carbon atoms, and
n is an integer of 0 or more.

4. The defoaming agent according to claim 1, wherein a divalent fluorine-containing functional group as $R^3$ is a group represented by general formula (PFPE) below,

[Chem. 3]

in the general formula (PFPE),
Xs are each independently a perfluoroalkylene group, and
n1 is a repeat number.

5. The defoaming agent according to claim 1, wherein a divalent silicone chain-containing functional group as $R^3$ is a group represented by general formula (SILICONE) below,

[Chem. 4]

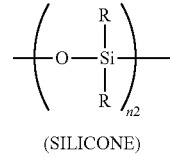

(SILICONE)

in the general formula (SILICONE),
Rs are each independently an alkyl group having 1 to 18 or a phenyl group, and
n2 is a repeat number.

6. The defoaming agent according to claim 1, wherein the polymerization component further contains a polymerizable monomer (2) having one or more selected from the group consisting of an alkyl group having 1 to 30 carbon atoms, an aromatic group having 6 to 20 carbon atoms, and a group containing a polyoxyalkylene chain.

7. The defoaming agent according to claim 6, wherein the polymerizable monomer (2) is one or more selected from the group consisting of a compound represented by general formula (2-1) below and a compound represented by general formula (2-2) below,

[Chem. 5]

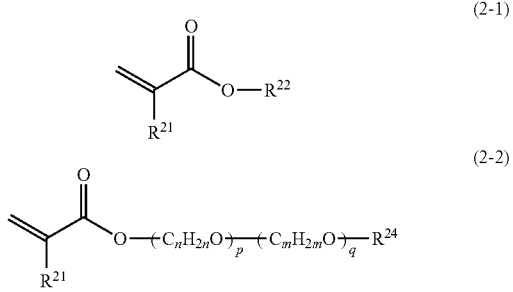

(2-1)

(2-2)

in the formulae (2-1) and (2-2),
$R^{21}$ is a hydrogen atom or a methyl group,
$R^{22}$ is an alkyl group having 1 to 30 carbon atoms or a phenyl group,
$R^{23}$ is a hydrogen atom or a methyl group,
$R^{24}$ is a hydrogen atom, an alkyl group having 1 to 30 carbon atoms, or a phenyl group,
n is an integer within a range of 1 to 4,
m is an integer within a range of 1 to 4,
p and q are each independently an integer within a range of 0 to 200, and satisfy p+q≥1.

8. The defoaming agent according to claim 6, wherein the alkyl group having 1 to 30 carbon atoms is a cyclic alkyl group having 3 to 14 carbon atoms.

9. The defoaming agent according to claim 6, wherein the mass ratio between the polymerizable monomer (1) and the polymerizable monomer (2) is the polymerizable monomer (1): the polymerizable monomer (2)=within a range of 10:90 to 80:20.

10. The defoaming agent according to claim 1, wherein the weight-average molecular weight of within a range of 3,000 to 50,000.

11. A lubricating oil composition comprising a lubricant base oil and the defoaming agent according to claim 1.

12. A machine comprising a driving part using wherein the driving part is lubricated with the lubricating oil composition according to claim 11.

13. The defoaming agent according to claim 2, wherein the silicone chain-containing functional group as $R^2$ is a group represented by general formula (1-3) below,

[Chem. 2]

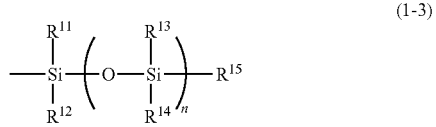

(1-3)

in the general formula (1-3),
$R^{11}$ is an alkyl group having 1 to 6 carbon atoms or a group represented by —OSi$(R^{16})_3$ with $R^{16}$ being each independently an alkyl group having 1 to 3 carbon atoms,
$R^{12}$ is an alkyl group having 1 to 6 carbon atoms or a group represented by —OSi$(R^{17})_3$ with $R^{17}$ being each independently an alkyl group having 1 to 3 carbon atoms,
$R^{13}$ is an alkyl group having 1 to 6 carbon atoms,
$R^{14}$ is an alkyl group having 1 to 6 carbon atoms,
$R^{15}$ is an alkyl group having 1 to 6 carbon atoms, and
n is an integer of 0 or more.

14. The defoaming agent according to claim 2, wherein a divalent fluorine-containing functional group as $R^3$ is a group represented by general formula (PFPE) below,

[Chem. 3]

(PFPE)

in the general formula (PFPE),
Xs are each independently a perfluoroalkylene group, and
n1 is a repeat number.

15. The defoaming agent according to claim 2, wherein a divalent silicone chain-containing functional group as $R^3$ is a group represented by general formula (SILICONE) below,

[Chem. 4]

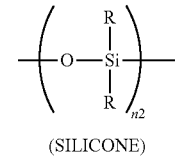

(SILICONE)

in the general formula (SILICONE),
Rs are each independently an alkyl group having 1 to 18 or a phenyl group, and
n2 is a repeat number.

16. The defoaming agent according to claim 2, wherein the polymerization component further contains a polymerizable monomer (2) having one or more selected from the group consisting of an alkyl group having 1 to 30 carbon atoms, an aromatic group having 6 to 20 carbon atoms, and a group containing a polyoxyalkylene chain.

17. The defoaming agent according to claim 7, wherein the alkyl group having 1 to 30 carbon atoms is a cyclic alkyl group having 3 to 14 carbon atoms.

18. The defoaming agent according to claim 7, wherein the mass ratio between the polymerizable monomer (1) and the polymerizable monomer (2) is the polymerizable monomer (1): the polymerizable monomer (2)=within a range of 10:90 to 80:20.

* * * * *